(12) United States Patent
Ha et al.

(10) Patent No.: US 8,300,436 B2
(45) Date of Patent: Oct. 30, 2012

(54) DEVICE FOR PROTECTION OF POWER FACTOR CORRECTION IN THREE PHASE POWER SUPPLY AND CONTROL METHOD THEREOF

(75) Inventors: Jong Hun Ha, Suwon-si (KR); Ho Gul Song, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 438 days.

(21) Appl. No.: 12/379,436

(22) Filed: Feb. 20, 2009

(65) Prior Publication Data

US 2010/0073973 A1 Mar. 25, 2010

(30) Foreign Application Priority Data

Sep. 22, 2008 (KR) ........................ 10-2008-0092625

(51) Int. Cl.
*H02H 3/28* (2006.01)
(52) U.S. Cl. .............................. 363/52; 307/127; 361/77
(58) Field of Classification Search .................... 361/76, 361/77; 307/127; 363/50, 52, 53
See application file for complete search history.

(56) References Cited

U.S. PATENT DOCUMENTS

| | | | | |
|---|---|---|---|---|
| 2,724,782 A * | 11/1955 | Holloway | ..................... | 307/127 |
| 4,021,704 A * | 5/1977 | Norbeck | .......................... | 361/77 |
| 4,196,378 A * | 4/1980 | Shirai | ........................... | 318/438 |
| 4,620,272 A * | 10/1986 | Fulton et al. | ..................... | 363/53 |
| 4,751,653 A * | 6/1988 | Junk et al. | ......................... | 702/58 |
| 5,184,063 A * | 2/1993 | Eisenhauer | ....................... | 324/86 |
| 5,828,309 A * | 10/1998 | Kumakura et al. | ........... | 340/658 |
| 5,892,674 A * | 4/1999 | Shimada et al. | ............... | 363/127 |
| 6,055,167 A * | 4/2000 | Shamkovich et al. | .......... | 363/52 |
| 6,417,581 B2 * | 7/2002 | Hall et al. | ...................... | 307/127 |
| 6,757,185 B2 * | 6/2004 | Rojas | ............................... | 363/89 |
| 7,384,203 B2 * | 6/2008 | Nagatsuka | ....................... | 385/89 |
| 7,514,932 B2 * | 4/2009 | Murry et al. | .................. | 324/508 |
| 7,848,852 B2 * | 12/2010 | Sakae et al. | .................... | 700/276 |

FOREIGN PATENT DOCUMENTS

KR 10-1997-0002525 1/1997

* cited by examiner

*Primary Examiner* — Harry Behm
(74) *Attorney, Agent, or Firm* — Staas & Halsey LLP (57) ABSTRACT

A power factor correction (PFC) protection device used when an abnormal current of a three-phase inverter occurs and a method of controlling the same are disclosed. If any misconnection (or non-connection) occurs due to a mistake of a producer at a power-supply input terminal applied to the reactor and the switching element, a current applied to the switching element becomes an abnormal current, such that the PFC cannot be controlled. During the PFC control, the device detects a current waveform generated from the switching element at a current sensor of the common potential terminal, and determines whether there is a mis-connection caused by the abnormal current. If the mis-connection is decided, the device compares a current pattern with a mis-connection pattern, and changes the PFC control output applied to the switching element according to the searched mis-connection pattern, such that the PFC control can be normally carried out.

17 Claims, 8 Drawing Sheets

DEVICE FOR PROTECTION OF POWER FACTOR CORRECTION IN THREE PHASE POWER SUPPLY AND CONTROL METHOD THEREOF

CROSS-REFERENCE TO RELATED APPLICATIONS

This application claims the benefit of Korean Patent Application No. 2008-0092625, filed on Sep. 22, 2008 in the Korean Intellectual Property Office, the disclosure of which is incorporated herein by reference.

BACKGROUND

1. Field

The present invention relates to a device protecting a power factor correction (PFC) in three-phase power supply (hereinafter referred to as a three-phase PFC protection device) and a method of controlling the same, and more particularly to a device for protecting and controlling a PFC caused by an abnormal or erroneous current of a three-phase inverter.

2. Description of the Related Art

Generally, an inverter is a power-supply converter (also called a power converter) converting a DC voltage into a three-phase AC voltage (U, V, W). Due to high energy efficiency and convenience of output control, the inverter has been generally used to control motors for use in a variety of electronic products (e.g., washing machines, refrigerators, air-conditioners, microwave ovens, and elevators).

A rectifying circuit rectifying a commercial AC power into a DC voltage and smoothing this rectified DC voltage is connected to the above-mentioned inverter, such that the DC voltage smoothened to a predetermined level is provided to the inverter. A power factor of this rectifying circuit is very low, i.e., about 0.5-0.6. Due to a phase difference between an input voltage (i.e., a voltage of AC power) and an input current (i.e., a current of AC power), a power factor is decreased, such that there arises a loss of power consumption caused by a reactive power.

In order to solve the above-mentioned problems, a conventional art carries out power factor correction (PFC) operations, which corrects a power factor to prevent the occurrence of a phase difference between an input voltage and an input current, using a switching control scheme. This switching control scheme detects a zero-crossing point of an input voltage, turns on a switching element at the detected point, turns off the switching element after the lapse of a predetermined period of time, and maintains an OFF status of the switching element until reaching a zero-crossing point of the next input voltage.

Specifically, if the switching control scheme for the power factor correction (PFC) is applied to a three-phase inverter which uses a three-phase power supply (i.e., R-, S-, and T-phases) to power on electronic products of large amounts of power consumption, and a mis-connection (or non-connection) occurs in a power-supply input terminal applied to a reactor and a switching element due to a mistake of a manufacturer, a current applied to the switching element becomes an abnormal current (e.g., a low current or overcurrent), such that it is impossible to carry out the PFC control. As a result, the problems of a harmonic wave and a power factor occur, and an overheated circuit also occurs. Although the PFC is not controlled due to a poor reactor condition or a mis-connection, this error condition is not displayed, such that the conventional system may be unavoidably operated under an unstable status.

SUMMARY

Therefore, it is an aspect of the invention to provide a three-phase power factor correction (PFC) protection device which controls a three-phase inverter based on a switching control scheme for a PFC operation to detect a waveform of a current signal applied to a switching element at a common potential terminal in order to determine the presence or absence of a mis-connection, compares patterns of the current signal when the presence of the mis-connection is determined, and changes a PFC control signal of the switching element according to the determined mis-connection pattern, such that it enables the PFC control to be normally operated, and a method of controlling the same.

Additional aspects and/or advantages of the invention will be set forth in part in the description which follows and, in part, will be apparent from the description, or may be learned by practice of the invention.

The foregoing and/or other aspects of the present invention can be achieved by the provision of a three-phase power factor correction (PFC) protection apparatus to operate on a three-phase power source, the PFC apparatus including: a rectifier to rectify the three-phase power source; a switching element which performs a (PFC) switching operation to correct a power factor of the rectifier; a current detector to detect a current waveform generated from the switching element; and a controller which determines a presence or absence of a mis-connection between the switching element and the power source according to the detected current waveform, searches for a mis-connection pattern corresponding to a current pattern of the power source if the presence of the mis-connection is determined, and changes a signal applied to the switching element according to the searching.

The switching element may be an insulated gate bipolar transistor (IGBT) switch, and a plurality of switching elements are connected to individual phases of output terminals of the rectifier, such that the switching elements switch output signals of the individual phases to allow the output signals of the individual phases to have the same current- and voltage-phases.

The current detector may be connected to an output common potential terminal of the switching element, such that it detects an abnormal current loaded at the common potential terminal during the PFC.

The abnormal current may be an overcurrent by which a current value loaded at the common potential terminal has a peak value higher than a reference value.

The controller, if the abnormal current occurs, may determine the presence of the mis-connection.

The apparatus may further include: a storage unit to store the current pattern caused by a connection of the three-phase power source, and the controller compares the detected current pattern with the current pattern stored in the storage unit, searches for a three-phase mis-connection pattern, and changes a PFC control signal applied to the switching element according to the searched mis-connection pattern.

The controller may store the PFC control signal changed by the mis-connection pattern in the storage unit, and controls the PFC control to be continuously normally operated.

The foregoing and/or other aspects of the present invention can be achieved by providing a three-phase power factor correction (PFC) protection control method including: rectifying a three-phase power source; performing a (PFC)

switching on a switching element to correct a power factor of the rectified power source; detecting a waveform of a current generated from the switching element; and determining a presence or absence of a mis-connection between the switching element and the power source according to the detected current waveform, searching for a mis-connection pattern of the power source corresponding to a current pattern if the presence of the mis-connection is determined, and changing a PFC control output signal applied to the switching element according to the searching.

The detecting the current waveform includes: detecting an abnormal current loaded at a common potential terminal of the switching element during the PFC control, and determining the presence of the mis-connection when the abnormal current occurs.

The method further includes: storing a current pattern caused by the mis-connection of the three-phase power source, and the changing the PFC control output includes if the mis-connection occurs, comparing the detected current pattern with the stored current pattern, searching for a three-phase mis-connection pattern, and changing a PFC control signal applied to the switching element according to the searched mis-connection pattern.

The method further includes: storing the PFC control signal changed by the mis-connection pattern, and controlling the PFC control to be continuously normally operated.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENT

Reference will now be made in detail to the embodiment of the present invention, an example of which is illustrated in the accompanying drawings, wherein like reference numerals refer to like elements throughout. The embodiment is described below to explain the present invention by referring to the figures.

Figure 1:
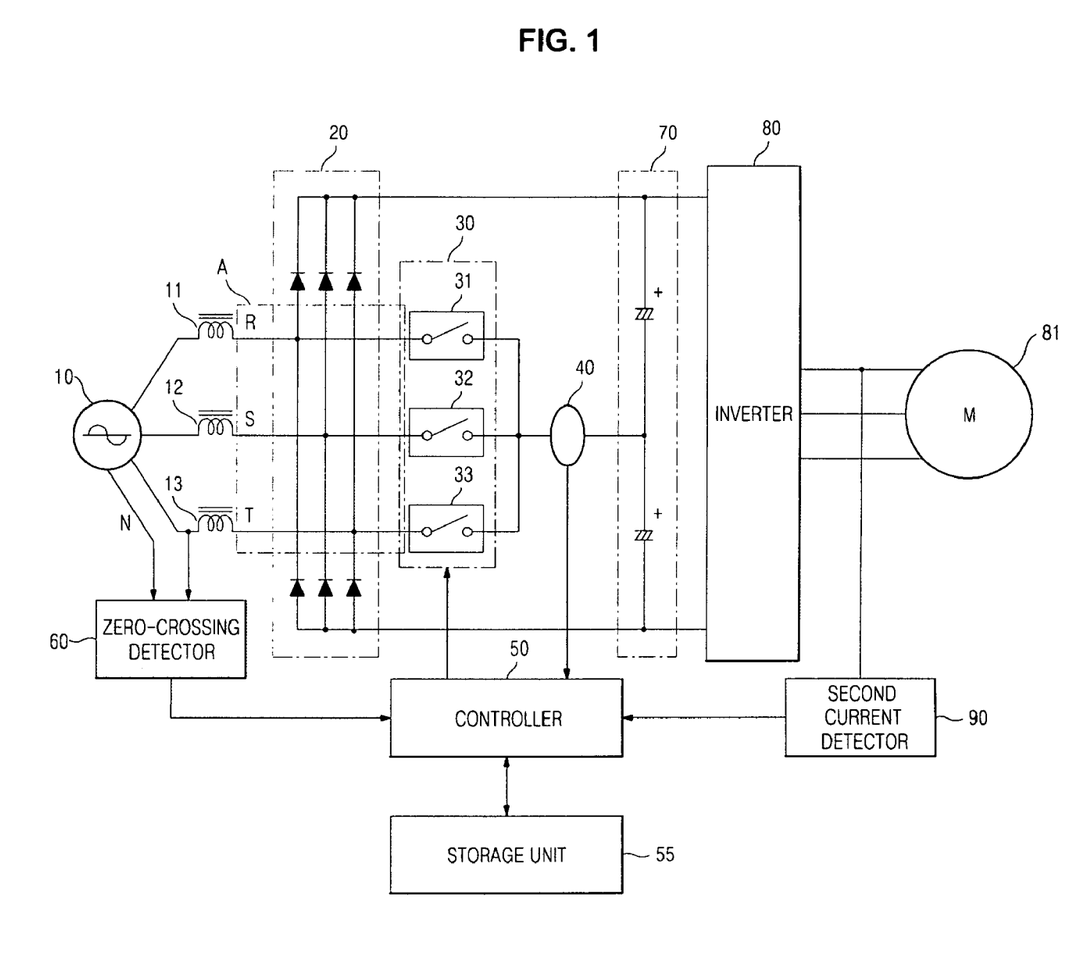
FIG. 1 is a circuit diagram illustrating a power factor correction (PFC) protection device for a three-phase inverter according to the embodiment of the present invention.

FIG. 1 is a circuit diagram illustrating a power factor correction (PFC) protection device for a three-phase inverter according to the embodiment of the present invention.

Referring to FIG. 1, the PFC protection device of the three-phase inverter includes a rectifier 20, a switching unit 30, a first current detector 40, a controller 50, and a storage unit 55. The rectifier 20 rectifies individual phases of a three-phase power source 10 (i.e., R-, S-, T-phase AC power source). The switching unit 30 is connected to an output terminal of the rectifier 20, and performs the PFC switching not to generate a phase difference between voltage and current signals of the output signal of the rectifier 20. The first current detector 40 is connected to a common potential terminal of the switching unit 30, such that it detects a current signal generated by the PFC operation. The controller 50 determines the presence or absence of a mis-connection according to a current waveform of the first current detector 40, changes a PFC control output in the case of the presence of the mis-connection, and controls a PFC normal operation. The storage unit 55 stores a current pattern caused by a connection of the three-phase power source 10.

In the three-phase power source 10, three sinusoidal currents having the same amplitude and frequency flow in three phases (i.e., R, S, and T phases) having a phase difference of 120° therebetween, and an N phase at which individual center points of three phases (R, S, T) are gathered is grounded, such that a 3-phase and 4-line wiring scheme is generally used for the three-phase power source 10.

The switching unit 30 may include three IGBT switches 31, 32, and 33 respectively connected to R, S, and T phases connected to the output terminal of the rectifier 20.

Reactors 11, 12, and 13 improving the power factor of the rectifier 20 are located between the three-phase power source 10 and the rectifier 20, such that the reactors 11, 12, and 13 are connected to R, S, and T phases, respectively. A zero-crossing detector 60 is connected to not only one phase (e.g., T phase) from among input terminals of the reactors 11, 12, and 13 but also an N phase, such that it detects zero-crossing points of input phase voltages and outputs the detected zero-crossing points to the controller 50.

Therefore, the controller 50 switches on the switching elements 31, 32, and 33 at the zero-crossing points of the phase voltages detected by the zero-crossing detector 60. After the lapse of a predetermined period of time, the controller 50 switches off the switching elements 31, 32, and 33 using a pulse width modulation (PWM) control method, maintains OFF states of the switching elements 31, 32, and 33 until reaching a zero-crossing point of the next phase voltage in such a way that it performs the PFC operation capable of correcting a power factor in order to prevent the occurrence of a phase difference between a phase voltage and a phase current.

In this case, in order to determine the presence or absence of a mis-connection (or non-connection) due to a mistake of a manufacturer or producer at a power-supply input terminal (denoted by "A") applied to the reactors 11-13 and the switching elements 31-33, the controller 50 determines whether there arises an abnormal current generated from the switching elements 31-33 on the basis of a current waveform of the first current detector 40. If the presence of mis-connection is determined due to the abnormal current, the controller 50 compares a current pattern with another current pattern stored in the storage unit 55, searches for any pattern of the three-phase mis-connection (e.g., R-S mis-connection, S-T mis-connection, R-T mis-connection, S-T-R mis-connection, and T-R-S mis-connection), and changes a PFC control output applied to the switching elements 31-33 according to the searched mis-connection pattern, such that it allows the PFC operation to be normally carried out.

The storage unit 55 stores current patterns (i.e., a T-phase current and an IGBT current) caused by a normal-connection of the three-phase power source 10, and also stores other current patterns (i.e., a T-phase current and an IGBT current) caused by a mis-connection.

The power factor correction (PFC) protection device of the three-phase inverter according to the embodiment of the present invention includes a DC link voltage generator 70, an inverter 80, and a second current detector 90. The DC link voltage generator 70 is connected to an output terminal of the rectifier 20, such that it generates a DC link voltage having an improved power factor. The inverter 80 is connected to the DC link voltage generator 70, converts the generated DC link voltage into a three-phase AC voltage, and transmits the three-phase AC voltage to a motor 81. The second current detector 90 detects the magnitude of a load current (i.e., a phase current) provided to the motor 81, and transmits the detected load-current magnitude to an analog-to-digital (AD) converter.

Therefore, the controller controls a duty ratio of a PWM signal controlling the switching elements 31, 32, and 33 according to the magnitude of load current detected by the second current detector 90.

The above-mentioned three-phase power factor correction (PFC) protection device and a method of controlling the same will hereinafter be described in detail.

Referring to FIG. 1, if the three-phase power source 10 is applied to the PFC device, the three-phase power source 10 serving as R-, S-, and T-phase AC power-supply signals is applied to the reactors 11, 12, and 13, and each of the R-, S-, and T-phase AC power-supply signals is applied to the rectifier 20, such that the R-, S-, and T-phase AC power-supply signals are rectified by the rectifier 20.

The voltage rectified by the rectifier 20 is applied to the DC link voltage generator 70, such that the DC link voltage generator 70 generates a DC link voltage needed to drive the motor 81. The DC link voltage generated from the DC link voltage generator 70 is supplied to the motor 81 via the inverter 80.

In this way, when the DC link voltage is supplied to the motor 81 via the three-phase inverter 80, the power factor may be deteriorated due to a phase difference between the phase voltage and the phase current applied to the reactors 11, 12, and 13.

Therefore, in order to solve the above-mentioned problems, the power factor correction (PFC) protection device according to the embodiment of the present invention allows the zero-crossing detector 60 connected to any (e.g., T phase) of input terminals of the reactors 11, 12, and 13 as well as the N phase to detect a zero-crossing point at which phases of the phase voltages are zero-crossing, such that the zero-crossing detector 60 outputs the detected zero-crossing point to the controller 50. The controller 50 commands the second current detector 90 to detect the magnitude of a load current at the above-mentioned zero-crossing point detected by the zero-crossing detector 60, and calculates a pulse width (i.e., a duty ratio) on the basis of the detected load-current magnitude, such that the controller switches on the switching elements 31, 32, and 33 using a PWM control method based on the calculated pulse width.

If the switching elements 31, 32, and 33 are switched on, the phase current applied to the reactors 11, 12, and 13 linearly increases. If the switching elements 31, 32, and 33 are switched off by the PWM control of the controller 50, the phase currents applied to the reactors 11, 12, and 13 linearly decrease.

In this way, if ON and OFF operations of the switching elements 31, 32, and 33 are repeated by the PWM control of the controller 50, the phase current applied to the reactors 11, 12, and 13 tracks the phase of the phase voltage, and at the same time the power factor is improved in such a way that the PFC control operation is carried out.

However, during the above PFC control operation, if the mis-connection occurs due to a mistake of a manufacturer at a power-supply input terminal (denoted by "A") applied to the reactors 11-13 and the switching elements 31-33, an abnormal current (e.g., overcurrent) occurs in the current signal applied to the switching elements 31-33, such that the PFC control output is automatically changed and a PFC protection control is needed to normally perform the PFC control under the mis-connection. A detailed description thereof will hereinafter be described with reference to FIG. 2.

Figure 2:
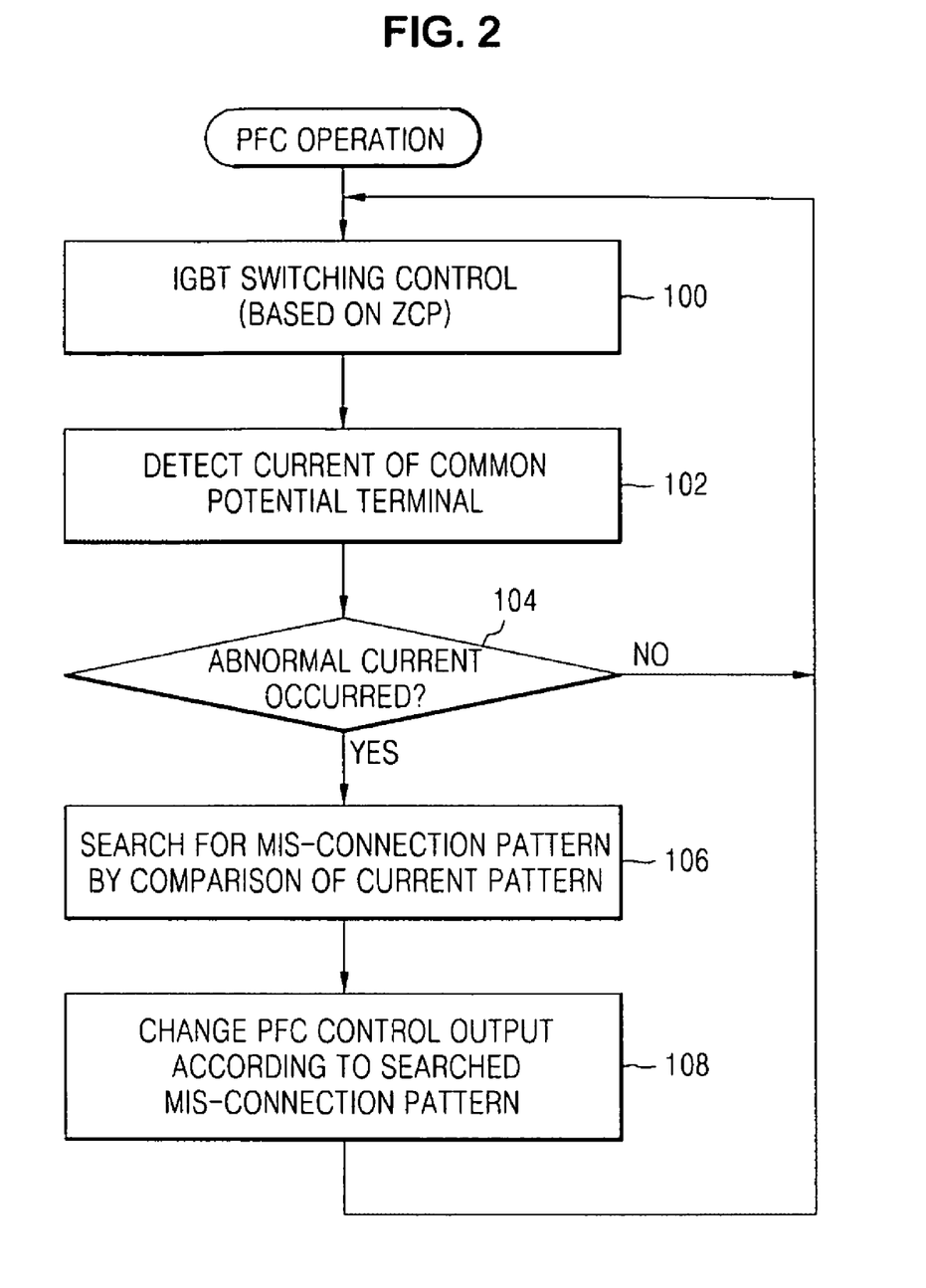
FIG. 2 is a flow chart illustrating a PFC protection control method for a three-phase inverter according to the embodiment of the present invention.

FIG. 2 is a flow chart illustrating a PFC protection control method for a three-phase inverter according to the embodiment of the present invention.

Referring to FIG. 2, in order to perform the PFC control operation at operation 100, the controller 50 switches on the switching elements 31, 32, and 33 using the PWM control at the duty ratio, which has been calculated according to the load-current magnitude detected by the second current detector 90 at a zero-crossing point (ZCP) of the T-phase voltage detected by the zero-crossing detector 60.

In order to detect any abnormal current (e.g., overcurrent) caused by a mis-connection of the power-supply input terminal "A" during the PFC control operation, a first current detector 40 connected to a common potential terminal of the switching elements 31-33 detects a current of the common potential terminal (i.e., IGBT current), and outputs the detected current to the controller 50 at operation 102.

Therefore, the controller 50 checks a waveform of the current of the common potential terminal detected by the first current detector 40, and determines the presence or absence of an abnormal current at operation 104. The abnormal current may indicate that a current flowing in the common potential terminal in the PFC control has a peak value higher than a reference value. In other words, the abnormal current may be considered as an overcurrent. So, if the current peak value is generated, the presence of the abnormal current caused by a mis-connection may be decided.

Therefore, if the mis-connection caused by the abnormal current has occurred at operation 104, the controller 50 compares a current pattern with another current pattern stored in the storage unit 44, such that the controller searches for the three-phase mis-connection patterns (S-T mis-connection, R-S mis-connection, R-T mis-connection, and three-line mis-connection) at operation 106.

Figure 3:
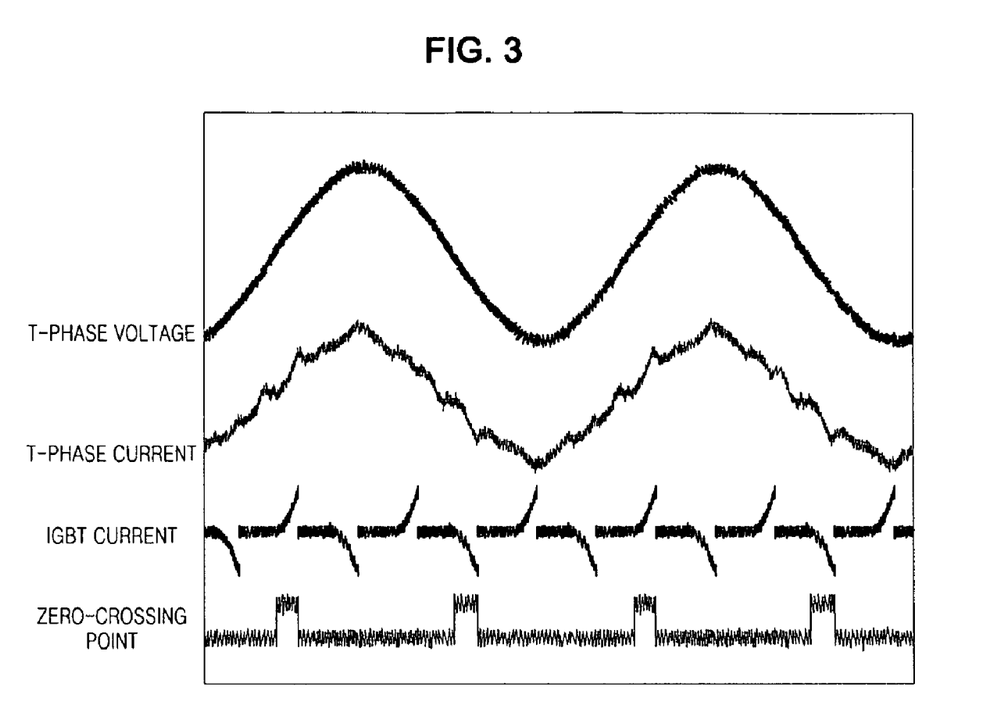
FIG. 3 is a waveform diagram illustrating a current signal detected at a common potential terminal in case of a normal connection caused by R-S-T connection.
Figure 4:
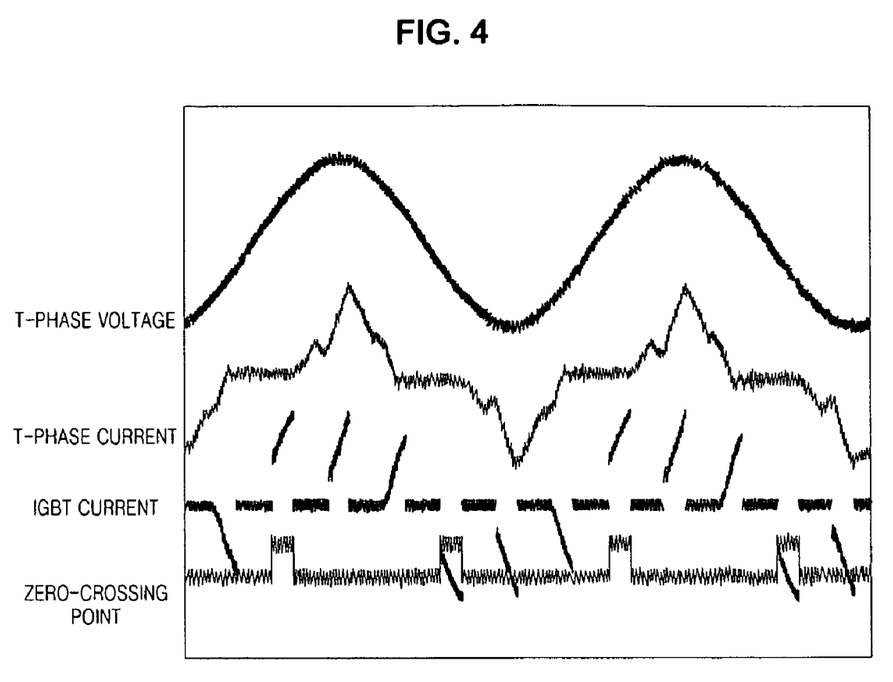
FIG. 4 is a waveform diagram illustrating a current signal detected at a common potential terminal in case of an S-T mis-connection caused by R-T-S connection.
Figure 5:
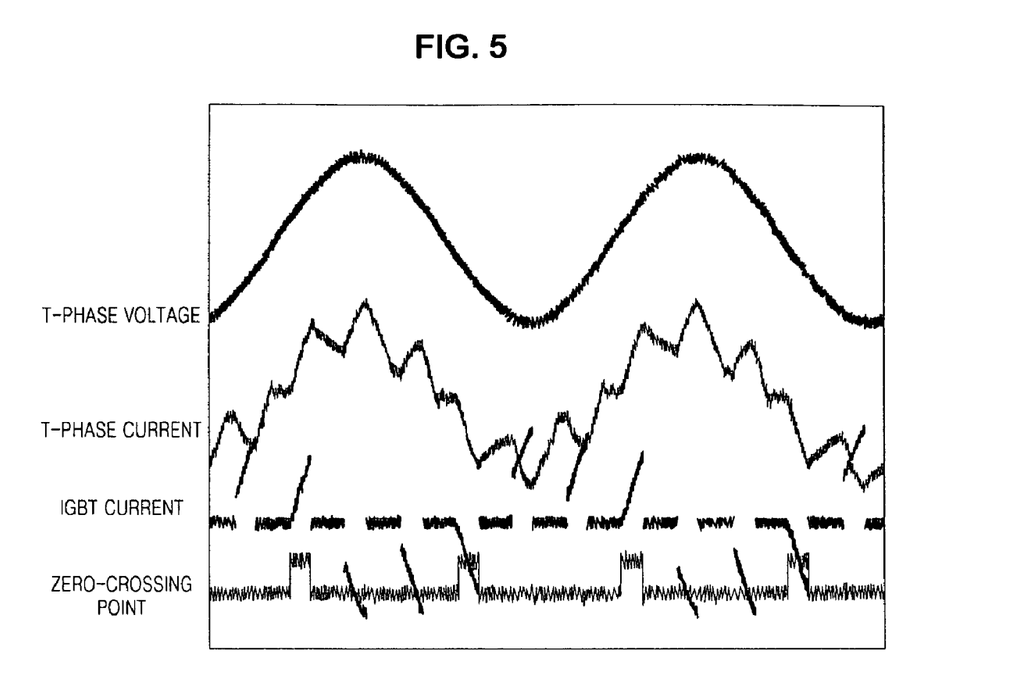
FIG. 5 is a waveform diagram illustrating a current signal detected at a common potential terminal in case of an R-S mis-connection caused by S-R-T connection.
Figure 6:
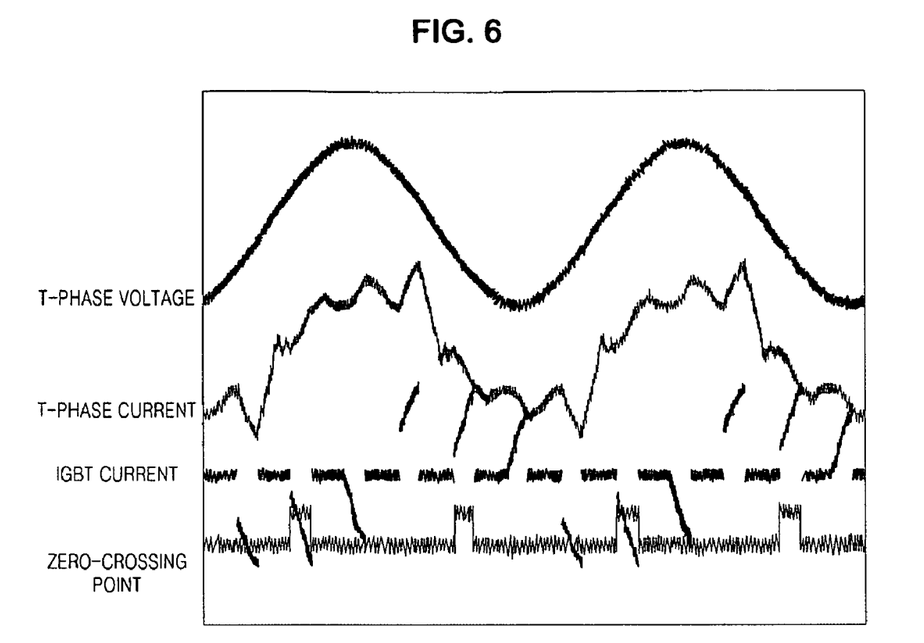
FIG. 6 is a waveform diagram illustrating a current signal detected at a common potential terminal in case of an R-T mis-connection caused by T-S-R connection.
Figure 7:
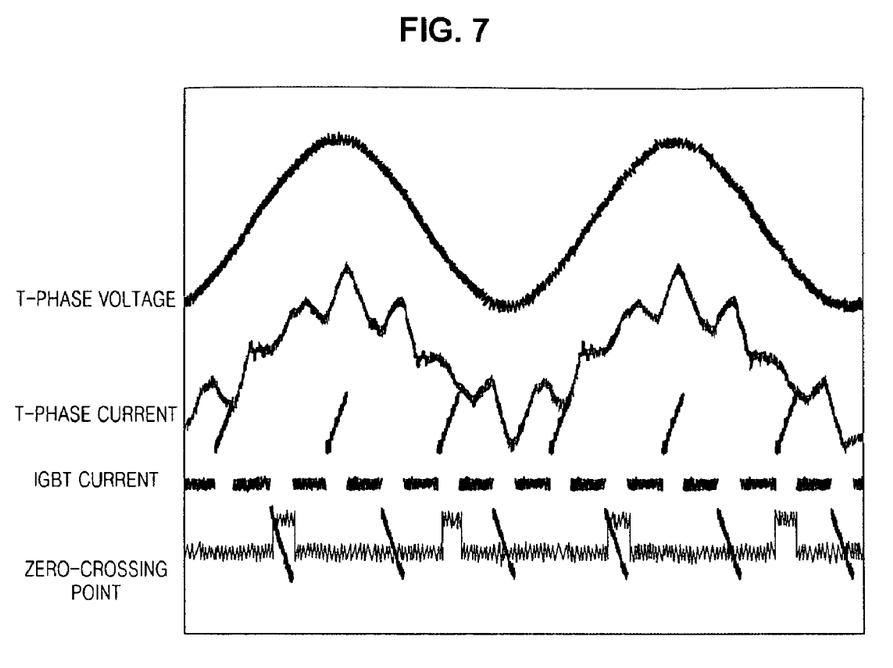
FIG. 7 is a waveform diagram illustrating a current signal detected at a common potential terminal in case of a three-line mis-connection caused by S-T-R connection.

FIG. 3 is a waveform diagram illustrating a current signal detected at a common potential terminal in the case of a normal connection caused by R-S-T connection. FIG. 4 is a waveform diagram illustrating a current signal detected at a common potential terminal in the case of an S-T mis-connection caused by R-T-S connection. FIG. 5 is a waveform diagram illustrating a current signal detected at a common potential terminal in the case of an R-S mis-connection caused by S-R-T connection. FIG. 6 is a waveform diagram illustrating a current signal detected at a common potential terminal in the case of an R-T mis-connection caused by T-S-R connection. FIG. 7 is a waveform diagram illustrating a current signal detected at a common potential terminal in the case of a three-line mis-connection caused by S-T-R connection. FIG.

Figure 8:
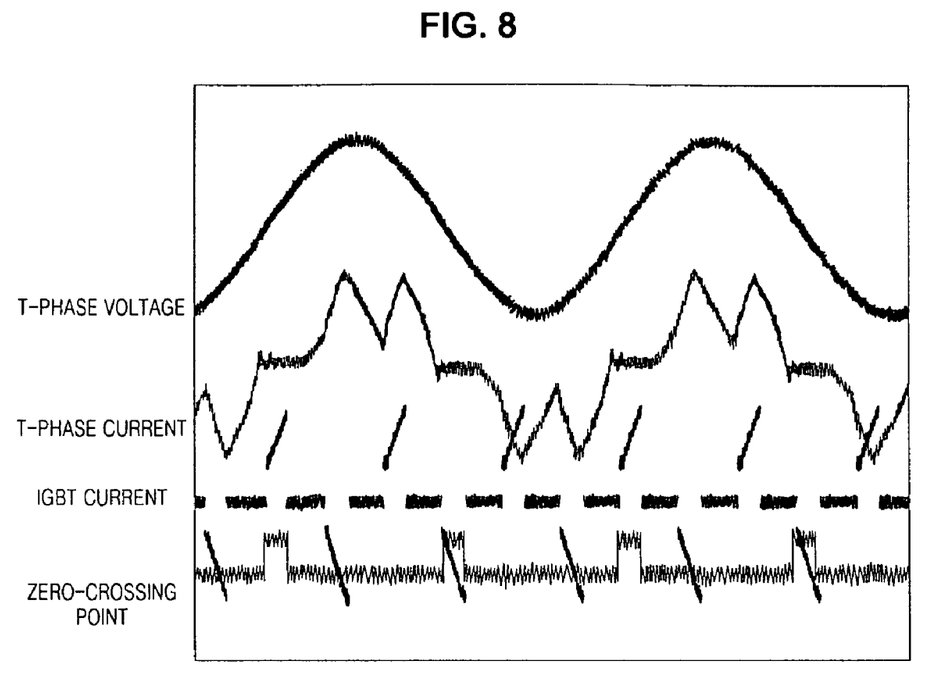
FIG. 8 is a waveform diagram illustrating a current signal detected at a common potential terminal in case of a three-line mis-connection caused by T-R-S connection.

8 is a waveform diagram illustrating a current signal detected at a common potential terminal in the case of a three-line mis-connection caused by T-R-S connection.

As can be seen from FIG. 3, in case of a normal connection, the current waveform of the common potential terminal detected by the first current detector 40 is equal to or less than the peak value, and the PFC switching operation begins at the zero-crossing point.

However, as can be seen from FIGS. 4 to 8, in the case of a mis-connection, the common current wave form of the potential terminal detected by the first current detector 40 is equal to or higher than the peak value, and the PFC switching operation does not begin at the zero-crossing point. In this case, the PFC control is not carried out, the problems of harmonic waves and power factor are generated, and the circuit overheating is also generated, such that the PFC control is unavoidably carried out under an unstable status.

Therefore, the controller 50 changes the PFC control signals applied to the switching elements 31-33 according to the searched mis-connection pattern, such that the controller can normally perform the PFC control at operation 108.

For example, as shown in FIG. 4, in the case of the S-T mis-connection caused by the R-T-S connection, the controller 50 changes PFC control output pins of a second switching element 32 corresponding to the S-phase and a third switching element 33 corresponding to the T-phase according to the S-T mis-connection pattern, such that the controller can normally perform the PFC operation without replacing the circuit.

For another example, as shown in FIG. 5, in the case of the R-S mis-connection caused by the S-R-T connection, the controller 50 changes PFC control output pins of a first switching element 31 corresponding to the R-phase and a second switching element 32 corresponding to the S-phase according to the R-S mis-connection pattern, such that the controller can normally perform the PFC operation without replacing the circuit.

Also, the controller 50 changes PFC control output pins of the first to third switching elements 31-33 according to any mis-connection patterns shown in FIGS. 6 to 8, such that it can allow the PFC operation to be normally carried out irrespective of the mis-connection.

Moreover, the controller 50 stores the PFC control output changed by the mis-connection pattern in the storage unit 55. Although the mis-connection caused by the abnormal current occurs, the controller 50 continuously changes the PFC control output so as to stably perform the PFC control operation.

Although an embodiment has been shown and described, it would be appreciated by those skilled in the art that changes may be made in this embodiment without departing from the principles and spirit of the invention, the scope of which is defined in the claims and their equivalents.

What is claimed is:

1. An apparatus to operate on three-phase electric power received from a three-phase power source, the apparatus comprising:
    a rectifier to rectify the three-phase power;
    a plurality of switching elements which perform a power factor correction (PFC) switching operation to correct a power factor of the rectifier;
    a detector to detect a waveform generated from the switching elements; and
    a controller which controls switching of the switching elements, determines a presence or absence of a mis-connection between at least one of the plurality of switching elements and the power source, and operable to change a sequential order in which the switching elements are operated from a first sequential order to a second sequential order based on the waveform detected by the detector to control the PFC to be continuously normally operated.

2. The apparatus according to claim 1, wherein the rectifier comprises a plurality of output terminals, and each of the switching elements comprises an insulated gate bipolar transistor (IGBT) switch, and the plurality of the switching elements are connected to individual phases of the output terminals of the rectifier, such that the switching elements switch output signals of the individual phases to allow output signals of the individual phases to have same current- and voltage-phases.

3. The apparatus according to claim 1, wherein the switching elements are coupled to an output common potential terminal, and the detector is connected to the output common potential terminal of the switching elements, such that the detector is used to detect an abnormal current loaded at the common potential terminal during the PFC switching operation.

4. The apparatus according to claim 3, wherein the abnormal current is an overcurrent by which a current value loaded at the common potential terminal has a peak value higher than a reference value.

5. The apparatus according to claim 1, wherein the three-phase electric power is received via three-phase transmission lines, the rectifier includes three rectifier elements, each respective rectifier element to rectify electric power received via each respective one of the three-phase transmission lines, and each of the switching elements is coupled to each of the respective rectifier elements.

6. An apparatus, to operate on three-phase electric power received from a three-phase power source, the apparatus comprising:
    a rectifier to rectify the three-phase power;
    a plurality of switching elements which perform a power factor correction (PFC) switching operation to correct a power factor of the rectifier;
    a detector to detect a waveform generated from the switching elements; and
    a controller which controls switching of the switching elements, and operable to change a sequential order in which the switching elements are operated from a first sequential order to a second sequential order based on the waveform detected by the detector
    wherein the switching elements are coupled to an output common potential terminal, and the detector is connected to the output common potential terminal of the switching elements, such that the current detector is used to detect an abnormal current loaded at the common potential terminal during the PFC switching operation,
    wherein the abnormal current is an overcurrent by which a current value loaded at the common potential terminal has a peak value higher than a reference value
    wherein the controller, if the abnormal current occurs, determines a presence of a mis-connection between the switching elements and three-phase transmission lines of the three-phase power source.

7. An apparatus to operate on three-phase electric power received from a three-phase power source, the apparatus comprising:
    a rectifier to rectify the three-phase power;
    a plurality of switching elements which perform a power factor correction (PFC) switching operation to correct a power factor of the rectifier;
    a detector to detect a waveform generated from the switching elements;

a controller which controls switching of the switching elements, and operable to change a sequential order in which the switching elements are operated from a first sequential order to a second sequential order based on the waveform detected by the detector; and a storage unit to store data corresponding to a plurality of waveform patterns caused by a plurality of connection combinations between the switching elements and three-phase transmission lines of the three-phase power source, and the controller compares a waveform detected by the detector with the data corresponding to the plurality of waveform patterns stored in the storage unit, searches for a three-phase mis-connection pattern, and changes a PFC control signal applied to the switching element according to the searched mis-connection pattern.

8. The apparatus according to claim 7, wherein the controller stores the PFC control signal changed by the mis-connection pattern in the storage unit, and controls the PFC control to be continuously normally operated.

9. A method comprising:
rectifying a three-phase power source;
performing a power factor correction (PFC) switching operation on a switching unit including a plurality of switching elements to correct a power factor of the rectified power source;
detecting a waveform generated from the switching elements; and
determining a presence or absence of a mis-connection between the switching elements and the three-phase power source according to the detected waveform, determining a mis-connection pattern corresponding to the detected pattern if the presence of the mis-connection is determined, and changing a sequential order in which the switching elements are operated according to the mis-connection pattern determination.

10. The method according to claim 9, wherein the detecting the waveform includes:
detecting an abnormal current loaded at a common potential terminal of the switching elements.

11. The method according to claim 10, wherein the abnormal current is an overcurrent by which a current value loaded at the common potential terminal has a peak value higher than a reference value.

12. The method according to claim 9, further comprising:
storing a current pattern caused by the mis-connection of the three-phase power source, and
the changing the PFC control output includes:
if the mis-connection occurs, comparing the detected current pattern with the stored current pattern, searching for a three-phase mis-connection pattern, and changing a PFC control signal applied to the switching element according to the searched mis-connection pattern.

13. The method according to claim 12, further comprising:
storing the PFC control signal changed by the mis-connection pattern, and controlling the PFC control to be continuously normally operated.

14. An apparatus comprising:
a switching unit which performs a power factor correction (PFC) switching operation, the switching unit comprising a plurality of switching elements and an output common potential terminal;
a current detector to detect a current waveform generated from the switching element, the current detector being connected to the output common potential terminal of the switching element, such that the current detector detects an abnormal current loaded at the common potential terminal during the PFC;
a controller which controls switching of the switching elements; and
a rectifier to rectify three-phase electric power received via three-phase transmission lines,
wherein, when the abnormal current loaded at the common potential terminal is detected, the controller is operable to change a sequential order in which the switching elements are operated from a first sequential order to a second sequential order.

15. The apparatus according to claim 14, wherein the controller determines a presence or absence of a mis-connection between the switching elements and the three-phase transmission lines according to the detected waveform.

16. An apparatus to operate on three-phase electric power received from a three-phase power source, the apparatus comprising:
a rectifier to rectify the three-phase power;
a plurality of switching elements which perform a power factor correction (PFC) switching operation to correct a power factor of the rectifier;
a detector to detect a waveform generated from the switching elements; and
a controller which controls switching of the switching elements, and operable to change a sequential order in which the switching elements are operated from a first sequential order to a second sequential order based on the waveform detected by the detector,
wherein, when the waveform detected by the detector is abnormal, the controller is operable to change the sequential order in which the switching elements are operated from the first sequential order to the second sequential order.

17. An apparatus to operate on three-phase electric power received from a three-phase power source, the apparatus comprising:
a rectifier to rectify the three-phase power;
a plurality of switching elements which perform a power factor correction (PFC) switching operation to correct a power factor of the rectifier;
a detector to detect a waveform generated from the switching elements; and
a controller which controls switching of the switching elements, and operable to change a sequential order in which the switching elements are operated from a first sequential order to a second sequential order based on the waveform detected by the detector,
wherein the three-phase electric power is received via three-phase transmission lines, the rectifier includes three rectifier elements, each respective rectifier element to rectify electric power received via each respective one of the three-phase transmission lines, and each of the switching elements is coupled to each of the respective rectifier elements,
wherein the controller determines a presence of a mis-connection between the switching elements and the three-phase transmission lines according to the detected waveform and changes the sequential order in which the switching elements are operated based on the mis-connection determination.

* * * * *